(12) United States Patent
Park et al.

(10) Patent No.: US 11,665,360 B2
(45) Date of Patent: *May 30, 2023

(54) METHOD AND APPARATUS FOR DECODING A VIDEO SIGNAL

(71) Applicant: LG ELECTRONICS INC., Seoul (KR)

(72) Inventors: Joon Young Park, Seoul (KR); Seung Wook Park, Seoul (KR); Jung Sun Kim, Seoul (KR); Young Hee Choi, Seoul (KR); Byeong Moon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,914

(22) Filed: Dec. 28, 2021

(65) Prior Publication Data

US 2022/0124358 A1   Apr. 21, 2022

Related U.S. Application Data

(63) Continuation of application No. 17/107,083, filed on Nov. 30, 2020, now Pat. No. 11,240,520, which is a
(Continued)

(30) Foreign Application Priority Data

May 10, 2010   (KR) .......................... 10-2010-0043470

(51) Int. Cl.
*H04N 19/44*     (2014.01)
*H04N 19/70*     (2014.01)
(Continued)

(52) U.S. Cl.
CPC ............. *H04N 19/44* (2014.11); *H04N 19/11* (2014.11); *H04N 19/176* (2014.11);
(Continued)

(58) Field of Classification Search
CPC .... H04N 19/44; H04N 19/176; H04N 19/184; H04N 19/587; H04N 19/61; H04N 19/70; H04N 19/196; H04N 19/11
See application file for complete search history.

(56) References Cited

U.S. PATENT DOCUMENTS 6,148,028 A    11/2000 Kikuchi et al.
7,127,114 B2   10/2006 Lin et al.
(Continued)

FOREIGN PATENT DOCUMENTS

EP    1429564 A1   6/2004
EP    2106148 A2   9/2009
(Continued)

OTHER PUBLICATIONS

U.S. Office Action dated Sep. 14, 2012 for U.S. Appl. No. 12/574,283, 12 pages.
(Continued)

*Primary Examiner* — Jared Walker
(74) *Attorney, Agent, or Firm* — Dentons US LLP

(57) ABSTRACT

The present invention includes obtaining block type identification information on a partition of the current macroblock when the current macroblock is intra-mixed, specifying a bock type of the current macroblock based on the block type identification information, obtaining an ultra prediction mode of the current macroblock according to the block type of the partition of the current macroblock, and predicting the current macroblock using the intra prediction mode and a pixel value of a neighboring block.

3 Claims, 13 Drawing Sheets

Related U.S. Application Data continuation of application No. 16/380,345, filed on Apr. 10, 2019, now Pat. No. 10,880,563, which is a continuation of application No. 15/730,229, filed on Oct. 11, 2017, now Pat. No. 10,306,252, which is a continuation of application No. 14/694,280, filed on Apr. 23, 2015, now Pat. No. 9,819,954, which is a continuation of application No. 12/778,327, filed on May 12, 2010, now Pat. No. 9,113,168.

(60) Provisional application No. 61/261,360, filed on Nov. 15, 2009, provisional application No. 61/256,318, filed on Oct. 30, 2009, provisional application No. 61/226,252, filed on Jul. 16, 2009, provisional application No. 61/177,638, filed on May 12, 2009.

(51) Int. Cl.
| | | |
|---|---|---|
| *H04N 19/196* | (2014.01) | |
| *H04N 19/11* | (2014.01) | |
| *H04N 19/176* | (2014.01) | |
| *H04N 19/587* | (2014.01) | |
| *H04N 19/61* | (2014.01) | |
| *H04N 19/184* | (2014.01) | |

(52) U.S. Cl.
CPC ......... *H04N 19/184* (2014.11); *H04N 19/196* (2014.11); *H04N 19/587* (2014.11); *H04N 19/61* (2014.11); *H04N 19/70* (2014.11)

(56) References Cited

U.S. PATENT DOCUMENTS

| | | |
|---|---|---|
| 7,529,302 B2 | 5/2009 | Mukerjee et al. |
| 7,869,523 B2 | 1/2011 | Joch et al. |
| 8,199,815 B2 | 6/2012 | Kim et al. |
| 2004/0086047 A1 | 5/2004 | Kondo et al. |
| 2004/0233989 A1 | 11/2004 | Kobayashi et al. |
| 2005/0035968 A1 | 2/2005 | Garg et al. |
| 2005/0276493 A1 | 12/2005 | Xin et al. |
| 2006/0039476 A1 | 2/2006 | Watanabe et al. |
| 2006/0153297 A1 | 7/2006 | Boyce |
| 2006/0250653 A1 | 11/2006 | Joch et al. |
| 2007/0009044 A1 | 1/2007 | Tourapis et al. |
| 2007/0036224 A1 | 2/2007 | Srinivasan et al. |
| 2007/0047656 A1 | 3/2007 | Kim et al. |
| 2007/0183500 A1 | 8/2007 | Nagaraj et al. |
| 2008/0019448 A1 | 1/2008 | Lee et al. |
| 2008/0056355 A1 | 3/2008 | Guo et al. |
| 2008/0117976 A1 | 5/2008 | Lu et al. |
| 2008/0165848 A1 | 7/2008 | Ye et al. |
| 2008/0165849 A1 | 7/2008 | Moriya et al. |
| 2008/0260027 A1 | 10/2008 | Karczewicz |
| 2008/0291997 A1 | 11/2008 | Yoon et al. |
| 2008/0310512 A1 | 12/2008 | Ye et al. |

FOREIGN PATENT DOCUMENTS

| | | |
|---|---|---|
| EP | 2154898 A2 | 2/2010 |
| KR | 10-1742992 B1 | 6/2017 |
| KR | 10-1775533 A | 6/2017 |
| KR | 10-2037327 B1 | 10/2019 |
| WO | 2008/027192 A2 | 3/2008 |
| WO | 2008/117933 A1 | 10/2008 |
| WO | 2010/039733 A2 | 4/2010 |

OTHER PUBLICATIONS

PCT International Search Report dated Dec. 22, 2010 for Application No. PCT/KR2010/003006, 3 pages.

International Search Report issued in Application No. PCT/KR2009/005699, dated May 19, 2010, 3 pages.

U.S. Office Action dated Dec. 1, 2011 for U.S. Appl. No. 12/574,283, 17 pages.

European Search Report issued in Application No. 09 01 2635, dated Jul. 14, 2010, 11 pages.

Kim, J. et al., "Englarging MB size for high fidelity video coding beyond HD" 36, VCEG Meeting; Aug. 10, 2008-Oct. 10, 2008; San Diego US; (Video Coding Experts Group of ITU-T SG.16), Oct. 5, 2008, XP030003643.

JVT/Sullivan et al., "Draft ITU-T H.264:2004 Amd. 1ISO/IEC 14496-10:2004/FDAM1 AVC Frext" ITU Study Group 16-Video Coding Experts Group—ISO/IEC MPEG&ITU-T VCEG(ISO/IEC JTC1/SC29/WG11 and ITU-T SG16 Q6), XX, XX, No. LVT L047d12, Jul. 23, 2004, XP030005899.

Richardson, "H.264/MPEG-4 Part 10 White Paper—Prediction of Intra Macroblocks" Internet Citation, [Online] Apr. 30, 2003, XP002281494, URL:http://www.vcodex.com/h264.html/h264_intrapred.pdf, May 24, 2004.

Siwei MA et al., "High-definition Video Coding with Super-macroblocks", Proceedings of the International Society for Optical Engineering, Sep. 11, 2007, SPIE, USA, vol. 6508, No. 650816, Jan. 29, 2007, pp. 1-12, XP002538135.

VCEG: wftp3.itu.int/av-arch/video-site/0810_SabP'[Online], XP002588470.

Yu, L., "Low-complexity intra prediction" ITU Study Group 16—Video Coding Experts Group—ISO/IEC MPEG&ITU-T VCEG (ISO/IEC JTC1/SC29/WG11 and ITU-T SG16 Q6), XX, XX, No. VCEG-Z14r1, Apr. 17, 2005, XP030003459.

Jinho LEE et al., Intra-mixture Prediction Mode and Enhanced Most Probable Mode Estimation for Intra Coding in H.264/AVC:, Inc. IMS and IDC, 2009 Fifth International Joint Conference on, IEEE, Piscataway, NJ, USA, Aug. 25, 2009, XP031564943.

Qualcomm Inc, "Video Coding Using Extended Block Sizes", ITU (International Telecommunication Union) Study Group 16, vol. COM16 C123 E, Jan. 1, 2009, XP007912516.

Chen P et al., "Video coding using extended block sizes", 36. VCEG Meeting; Aug. 10, 2008-Oct. 10, 2008; San Diego, US; (Video Coding Experts Group of ITU-T SG.16), Oct. 15, 2008, XP030003645.

Sim et al., "Unidirectional 4x4 intra prediction", 36. VCEG Meeting; Aug. 10, 2008-Oct. 10, 2008; San Diego, US (Video Coding Experts Group of ITU-T SG.16), Oct. 6, 2008, XP030003638.

European Office Action dated Jan. 18, 2011 for Application No. 09012635, 6 pages.

Telecommunication Standardization Sector of ITU: "Advance video coding for generic audiovisual services", Series H: Audiovisual and Multimedia Systems, Infrastructure of audiovisual services—Coding of moving video, H.264, Mar. 2005.

Sharp: "A new intra macroblock type for adaptable transform block size", ITU Telecommunication Standardization Sector, COM 16-C 88-E, Jan. 2009.

| sub_mb_type[ mbPartIdx ] | Name of sub_mb_type[ mbPartIdx ] | NumSubMbPart( sub_mb_type[ mbPartIdx ] ) | SubMbPredMode( sub_mb_type[ mbPartIdx ] ) | SubMbPartWidth( sub_mb_type[ mbPartIdx ] ) | SubMbPartHeight( sub_mb_type[ mbPartIdx ] ) |
|---|---|---|---|---|---|
| inferred | na | na | na | na | na |
| 0 | P_L0_16x16 | 1 | Pred_L0 | 16 | 16 |
| 1 | P_L0_16x8 | 2 | Pred_L0 | 16 | 8 |
| 2 | P_L0_8x16 | 2 | Pred_L0 | 8 | 16 |
| 3 | P_L0_8x8 | 4 | Pred_L0 | 8 | 8 |

(b)

| sub_mb_type[ mbPartIdx ] | Name of sub_mb_type[ mbPartIdx ] | NumSubMbPart( sub_mb_type[ mbPartIdx ] ) | SubMbPredMode( sub_mb_type[ mbPartIdx ] ) | SubMbPartWidth( sub_mb_type[ mbPartIdx ] ) | SubMbPartHeight( sub_mb_type[ mbPartIdx ] ) |
|---|---|---|---|---|---|
| inferred | mb_type | 4 | Direct | 8 | 8 |
| 0 | B_Direct_8x8 | 4 | Direct | 8 | 8 |
| 1 | B_L0_16x16 | 1 | Pred_L0 | 16 | 16 |
| 2 | B_L1_16x16 | 1 | Pred_L1 | 16 | 16 |
| 3 | B_L0_16x8 | 1 | BiPred | 16 | 16 |
| 4 | B_L0_16x8 | 2 | Pred_L0 | 8 | 16 |
| 5 | B_L0_8x16 | 2 | Pred_L0 | 16 | 8 |
| 6 | B_L1_16x8 | 2 | Pred_L1 | 8 | 16 |
| 7 | B_L1_8x16 | 2 | Pred_L1 | 16 | 8 |
| 8 | B_Bi_16x16 | 2 | BiPred | 8 | 16 |
| 9 | B_Bi_8x16 | 2 | BiPred | 16 | 8 |
| 10 | B_L0_8x8 | 4 | Pred_L0 | 8 | 8 |
| 11 | B_L1_8x8 | 4 | Pred_L1 | 8 | 8 |
| 12 | B_Bi_8x8 | 4 | BiPred | 8 | 8 |

FIG. 5
I16×16
Intra MB type
I32×32 (4 modes)    (9 modes)    I8×8 (9 modes)
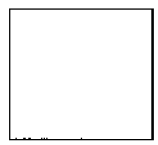 
(a)
Intra MB type
I32×32 (4 modes)    I16×16 (9 modes)    I8×8 (9 modes)    I4×4 (9 modes)
  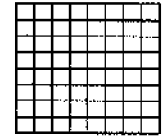
(b)
Intra MB type
I32×32 (4 modes)    I16×16 (9 modes)    I8×8 (9 modes)    I_mixed (I4×4, I8×8) (9 modes)
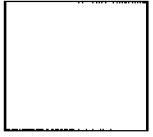 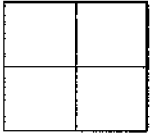 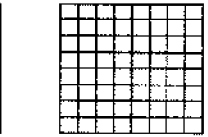
(c)
Intra MB type
I32×32 (4 modes)    I_mixed (I16×16, I8×8, I4×4)
 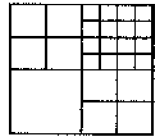
(d)

FIG. 11
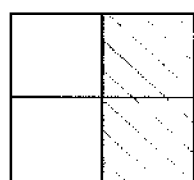
(a)
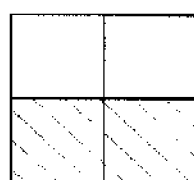
(b)
(c)
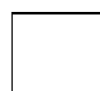 Boundary sub-macroblock
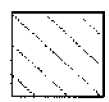 Non-boundary sub-macroblock FIG. 13
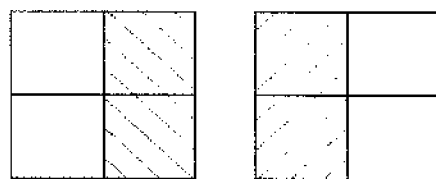
(a)
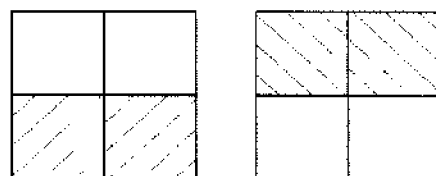
(b)
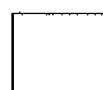 Boundary sub-macroblock
 Non-boundary sub-macroblock

METHOD AND APPARATUS FOR DECODING A VIDEO SIGNAL

CROSS-REFERENCE TO RELATED APPLICATION

This application is a Continuation of U.S. application Ser. No. 17/107,083 filed Nov. 30, 2020; which is a Continuation of U.S. application Ser. No. 16/380,345 filed Apr. 10, 2019, now U.S. Pat. No. 10,880,563 issued Dec. 29, 2020; which is a Continuation of U.S. application Ser. No. 15/730,229 filed Oct. 11, 2017, now U.S. Pat. No. 10,306,252 issued May 28, 2019; which is a Continuation of U.S. application Ser. No. 14/694,280 filed Apr. 23, 2015, now U.S. Pat. No. 9,819,954 issued Nov. 14, 2017; which is a Continuation of U.S. application Ser. No. 12/778,327 filed May 12, 2010, now U.S. Pat. No. 9,113,168 issued Aug. 18, 2015; which claims the benefit of U.S. Provisional Application No. 61/177,638 filed May 12, 2009; U.S. Provisional Application No. 61/226,252 filed Jul. 16, 2009; U.S. Provisional Application No. 61/256,318 filed Oct. 30, 2009; U.S. Provisional Application No. 61/261,360 filed Nov. 15, 2009 and Korean Application No. 10-2010-0043470 filed May 10, 2010, all of which are hereby incorporated by reference.

BACKGROUND OF THE INVENTION

Field of the Invention

The present inventions relate to a method and an apparatus for predicting intra or inter mode and coding as a block unit.

Discussion of the Related Art

Generally, a method of eliminating temporal redundancy and spatial redundancy, i.e., intra or inter prediction is performed to increase a compression ratio of the video signal. And, such a technology as DC transform, vector quantization and the like is used.

SUMMARY OF THE INVENTION

Accordingly, the present invention is directed to an apparatus and a method of processing a video signal that substantially obviate one or more of the problems due to limitations and disadvantages of the related art.

An object of the present invention is to provide an apparatus and a method of processing a video signal, by which the video signal is efficiently processed using intra prediction.

Another object of the present invention is to provide an apparatus and a method of processing a video signal, by which the number of bits required for a coding region failing to belong to an output region is decremented.

To achieve theses objects, the present invention proposes a method of defining a macroblock type of I slice in case of a macroblock greater than 16×16 and then obtaining a size of a prediction block of the macroblock and an intra prediction mode of the macroblock.

To achieve theses objects, the present invention proposes a method of defining a macroblock type of a boundary macroblock according to a slice type and then determining a size of a prediction block and an intra picture prediction mode for the boundary macroblock of a I slice, and an inter prediction mode using a skip mode for a boundary macroblock of a P slice or a B slice.

It is to be understood that both the foregoing general description and the following detailed description are exemplary and explanatory, and are intended to provide further explanation of the invention as claimed.

Accordingly, the present invention provides the following effects or advantages.

First of all, according to the present invention, a macroblock greater than 16×16 is adaptively used when a size of a video picture increases. Therefore, the present invention decreases the number of bits required for coding a macroblock type, thereby enhances efficiency of coding. In case of a macroblock of I slice, accuracy of prediction is enhanced by coding the macroblock in a sub-macroblock unit. Simultaneously, since a size of a prediction block of the macroblock is determined based ort transform size information, the number of bits required for coding a macroblock type is decreased, and efficiency of coding is enhanced. The present invention enables a decoder to derive or determine a macroblock type, an intra prediction mode, motion information and the like for a boundary macroblock instead of transmitting them separately, thereby decreasing the number of bits required for coding the macroblock type, the intra prediction mode, the motion information and the like.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a table of sub-macroblock type of P macroblock and B macroblock when a size of a macroblock is 32×32;

FIG. 5 is a diagram of an intra macroblock type according to one embodiment when a size of a macroblock is 32×32;

FIG. 11 is a diagram for a method of setting an intra prediction mode of a non-boundary sub-macroblock;

FIG. 13 is a diagram for a method of determining a macroblock type according to a position of a boundary macroblock within P slice or B slice.

DETAILED DESCRIPTION OF THE INVENTION

Figure 1:
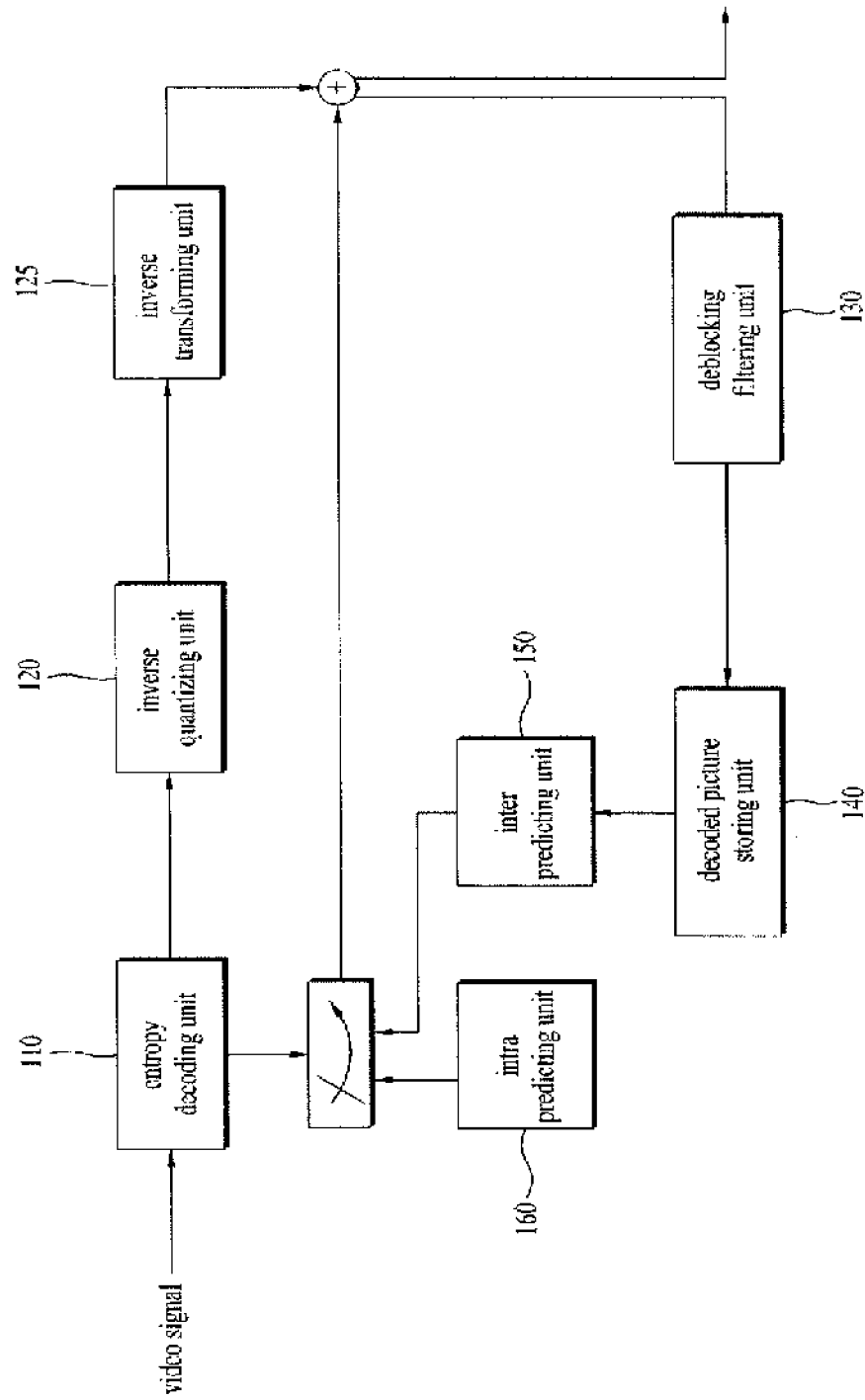
FIG. 1 is a schematic block diagram of a video signal decoding apparatus.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing a video signal according to the present invention is to obtain macroblock type of a current macroblock, to obtain block type identification information for a partition of the current macroblock when the macroblock type is intra-mixed, to specify a block type of the partition of the current macroblock based on the block type identification information, to obtain an intra prediction mode of the current macroblock according to the block type of the partition of the current macroblock, and to predict the current macroblock using the intra prediction mode and a pixel value of a neighboring block.

According to the present invention, the block type identification information is information specifying prediction mode for the partition of the current macroblock and a size of a prediction block.

According to the present invention, the intra prediction mode is obtained based on intra prediction mode reference information, the intra prediction mode reference information is obtained based on the block type of the partition of the current macroblock, and the intra prediction mode reference information indicates whether an intra prediction mode of a prediction block is derived from an intra prediction mode of a neighboring block.

According to the present invention, when the intra prediction mode reference information indicates that the infra prediction mode of the prediction block is derived from the intra prediction mode of the neighbor block, the intra prediction mode of the current macroblock is derived from the intra prediction mode of the neighbor block.

According to the present invention, the neighbor block includes a left block of the prediction block and a right block of the prediction block, and the intra prediction triode of the current macroblock is derived into a minimum value in the intra prediction modes of the left block and the right block.

According to the present invention, when the intra prediction mode reference information indicates that the intra prediction mode of the predicted block is not derived from the intra prediction mode of the neighbor block, the intra prediction mode of the current macroblock is parsed from a bitstream.

To achieve these and other advantages and in accordance with the purpose of the present invention, as embodied and broadly described, a method of processing a video signal according to the present invention is to obtain frame offset information for a video sequence, to specify whether a current macroblock is a boundary macroblock using the frame offset information, to derive a macroblock type of the current macroblock in consideration of a slice type when the current macroblock is the boundary macroblock according to the frame offset information.

According to the present invention, the frame offset information is information specifying samples belonging to a specific region within a frame as samples within a picture of the video sequence, the boundary macroblock is a macroblock including a region not belonging to an output region, the output region is a rectangular region specified within a coded region, and the coded region is a frame outputted by a decoding process.

According to the present invention, size information of a prediction block, CBP information, and an intra prediction mode for a non-boundary sub-macroblock is derived when the current macroblock is coded in an intra mode according to the macroblock type.

According to the present invention, the non-boundary sub-macroblock is a sub-macroblock of the boundary macroblock, and does not include a region belonging to the output region, and the intra prediction mode includes horizontal prediction, vertical prediction and average prediction.

According to the present invention, the CPR information is set to 0, the intra prediction mode is derived in consideration of a position within a current frame of the non-boundary sub-macroblock.

According to the present invention, the intra prediction mode is derived by the average prediction when the non-boundary sub-macroblock is located at a left side or a top side within the current frame, the intra prediction mode is derived by the horizontal prediction when the non-boundary sub-macroblock is located at a right side within the current frame, and the intra prediction mode is derived by the vertical prediction when the non-boundary sub-macroblock is located at a bottom side within the current frame.

According to the present invention, a non-boundary sub-macroblock is coded in a skip mode when the current macroblock is coded in an inter mode according to the macroblock type.

It is to be understood that both the foregoing general description and the following detailed description are exemplary and explanatory and are intended to provide further explanation of the invention as claimed.

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

First of all, a macroblock may be explained as follows. A macroblock may be a basic unit for processing a video frame and is defined as a region composed of 16×16 pixels. It may be defined a macroblock larger than 16×16 as a size of a video picture increases. A macroblock larger than 16×16 may become a basic unit for processing a video frame having resolution greater than that of the related art. For instance, this macroblock may be defined as a region composed of 32×32 or 64×64 pixels. In this case, a macroblock larger than 16×16 may become a basic unit for processing a video frame having resolution greater than that of the related art.

Meanwhile, a macroblock larger than 16×16 may be adaptively used according to resolution of a video picture. For instance, if resolution of a video picture is greater than VGA, a size of a macroblock may be defined into 16×16. Accordingly, it may use a block having such a size as 16×8, 8×16, 4×8, 8×4 and 4×4 as a partition of the macroblock. If resolution is greater than VGA and smaller than 1,080 P, it may set a size of a macroblock to 32×32. Accordingly, it may use a block having such a size as 32×16, 16×32, 16×16, 16×8, 8×16 and 8×8. If resolution is greater than 1,080 P and smaller than 4 k×2 k, it may set a size of a macroblock to 64×64. And, it may use a block having such a size as 64×32, 32×64, 32×32, 32×16, 16×32 and 16×16. Yet, an encoder may determine a size of an optimal macroblock among a 16×16 macroblock and macroblock larger than 16×16 according to resolution of a video picture. The determined size information of the macroblock may be transferred to a decoder on a slice level or a sequence level. Therefore, it adaptively may use the size of the macroblock.

In the following description, a macroblock type according to a size of a macroblock is explained. First of all, according to a prediction mode of a macroblock, i.e., an intra mode or an inter mode, a macroblock type may be defined. A macroblock may be predicted by a block unit of a predetermined size. Hereinafter, a size of a prediction block may be used as having the same meaning of the block unit of the predetermined size. The macroblock type may include a size of a prediction block. And, a macroblock type performing inter prediction may include information on a reference direction.

Particularly, a macroblock, coded in au intra mode, may be coded by such a block unit as 16×16 pixels, 8×8 pixels and 4×4 pixels. A macroblock, coded in an inter mode, uses 16×16 pixels, 16×8 pixels, 8×16 pixels or 8×8 pixels as a macroblock type for motion compensation. If the 8×8 pixels are used, 8×4 pixels, 4×8 pixels and 4×4 pixels may be available for sub-macroblock types.

In the following description, a macroblock type may be defined in consideration of a size greater than 16×16. First of all, as a size of a video picture increases, the frequency of use for a relatively small macroblock type may be decreased. It may eliminate information on this macroblock type, thereby it may reduce the number of bits allocated to the macroblock type. For instance, if a resolution of a video picture is smaller than VGA, it may use the above explained macroblock type. Yet, if the resolution is greater than VGA and smaller than 1,080 P, a macroblock type smaller than 8×8 pixels may not be used. In particular, a macroblock, coded in an intra mode. may be coded by such a block unit as 16×16 pixels and 8×8 pixels. And, a macroblock, coded in an inter mode, may use such a macroblock type as 16×16 pixels, 16×8 pixels, 8×16 pixels and 8×8 pixels. In this case, a sub-macroblock type may not use 8×4 pixels, 4×8 pixels or 4×4 pixels. If a resolution is grater than 1,080 P and smaller than 4 k×2 k, macroblock type smaller than 16×16 pixels may not be used. In particular, for blocks coded in an intra mode and an inter mode, 16×16 pixels may be used as a macroblock type.

Likewise, an encoder may determine an optimal macroblock type according to resolution of a video picture. And, the determined macroblock type may be transferred to a decoder on a slice level or a sequence level. Accordingly, a macroblock type may be adaptively used.

FIG. 1 is a schematic block diagram of a video signal decoding apparatus.

Referring to FIG. 1, a video signal decoding apparatus according to the present invention includes an entropy decoding unit 110, a inverse quantizing unit 120, an inverse transforming unit 125, a deblocking filtering unit 130, a decoded picture storing unit 140, an inter predicting unit 150 and an ultra predicting unit 160.

The entropy decoding unit 110 extracts a transform coefficient of each macroblock, a motion vector, a reference picture index and the like by performing entropy decoding on a video signal bitstream. The inverse quantizing unit 120 inverse-quantizes the entropy decoded transform coefficient, and the inverse transforming unit 125 then restores an original pixel value using the inverse-quantized transform coefficient. The deblocking filtering unit 130 is applied to each coded macroblock to reduce block distortion. A picture through filtering is stored in the decoded picture storing unit 140 to be outputted or used as a reference picture. The inter predicting unit 150 predicts a current picture using the reference picture stored in the decoded picture storing unit 140 and inter prediction information (e.g., reference picture index, motion vector, etc.) delivered from the entropy decoding unit 110. In particular, motion vectors of blocks adjacent to a current block (hereinafter named neighboring blocks) are extracted from a video signal. A predicted motion vector of the current block may be obtained from the neighboring block. The neighboring block may include a block located at a left, top or right top side of the current block. For instance, a predicted motion vector of a current block may be obtained using median value of horizontal and vertical components of motion vectors of neighboring blacks. Alternatively, in case that a left block of a current block has at least one prediction block coded in an inter mode, a predicted motion vector of the current block may be obtained using a motion vector of a prediction block located at a top side of the current block. In case that a top block of a current block has at least one prediction block coded in an inter mode, a predicted motion vector of the current block may be obtained using a motion vector of a prediction block located at a most left side, in case that blocks located at top and right sides of a current block among neighboring blocks are located outside a boundary of a picture or slice, a predicted motion vector of the current block may be set to a motion vector of a left block. If there exists one block having the some reference picture index of a current block among neighboring blocks, a motion vector of the block may be used for motion prediction.

A predicted motion vector may be obtained based on a partition of a macroblock according to a macroblock type. For instance, when a partition of the current macroblock according to a current macroblock type is 8×16, if an index f the partition of the macroblock is set to 0, a left block of the current macroblock may be set to be used for prediction. If an index of the partition of the macroblock is set to 1, a right top block of a current block may be set to be used for prediction. When a partition of the current macroblock according to a current macroblock type is 16×8, if an index of the partition of the macroblock is set to 0, a top block of a current block may be set to be used for prediction. If an index of the partition of the macroblock is set to 1, a left block of a current block may be set to be used for prediction.

In obtaining a prediction motion vector of a current block, it may define various kinds of motion vectors extractable from neighboring blocks as candidates for a predicted motion vector. As mentioned in the foregoing description, the candidates for the predicted motion vector includes a motion vector of one block among neighboring blocks, a median value of motion vectors of neighboring blocks, an average value of neighboring block. And, a candidate of a predicted motion vector is determined in consideration of the frequency number of motion vector of the neighboring block, by which the candidates are non-limited. Accordingly, an encoder selects a motion vector having best efficiency as a predicted motion vector from the candidates for the predicted motion vector, and then send the selected motion vector to a decoder. The selected motion vector may be obtained in a slice level or a macroblock level. The candidate of the predicted motion vector may be defined using an index. And, the selected motion vector includes this index.

A size of bits to be coded may be reduced by coding a difference vector between a motion vector of a current block and a predicted motion vector of the current block. The motion of the current block is compensated using the predicted motion vector and the difference vector extracted from a video signal. Moreover, this motion compensation may be performed using one reference picture or a plurality of pictures.

For instance, in case that a size of a macroblock is 16×16, total of partitions including 16×16, 16×8, 8×16, 8×8, 8×4, 4×8, and 4×4 may be available for inter prediction. They may be hierarchically represented as macroblock or sub-macroblock types. In particular, a size of a prediction block may be represented as a macroblock type and one of 16×16, 16×8, 8×16 and 8×8 may be selected as the size. If 8×8 is selected, one partition may be selected as a sub-macroblock type from 8×8, 8×4, 4×8, and 4×4.

A reference picture index and a motion vector may be coded for each prediction block. Alternatively, a reference picture index may be coded for each macroblock and a motion vector may be coded for each prediction block. Moreover, a coding scheme for a sub-macroblock may be determined in the same manner of a macroblock. Besides, it is understood that the above-mentioned contents relevant to the inter prediction may be applicable to a case of performing the following inter prediction in the same manner of the above description.

A skip macroblock is a macroblock coded in skip mode. In reconstructing a current macroblock, a skip macroblock is reconstructed by using a pixel value of a macroblock within a previously coded reference picture instead of sending information on the current macroblock, i.e., a motion vector, a reference picture index and a residual data. In performing skip macroblock coding, a motion compensation using a motion vector is accompanied. This motion vector may be derived using a neighboring block. The former method for deriving a motion vector may be identically applicable to a method for deriving the motion vector. In the following description, a method for deriving a motion vector and a reference picture index of a B skip macroblock is explained. First of all, a picture having a smallest reference index among List1 reference pictures is defined as an anchor picture. And, a block of the anchor picture co-located at the same spatial position of the current block is defined as an anchor block.

For instance, motion information of a current block may be predicted using motion information of the anchor block. A motion vector of anchor block in a List0 direction may be defined as mvCo1. In this case, if a motion vector of the anchor block in the List0 direction does not exist, but a motion vector in List1 direction exists, a motion vector in the List1 direction may be set to mvCo1. In this case, in case of B picture, two random pictures are used as reference pictures. In doing so, the prediction is named List0 prediction or List1 prediction. For instance, the List0 prediction means prediction for a forward direction, while the List1 prediction means prediction for a backward direction.

List0 reference picture of a current block may become a picture referred to by the mvCo1, and List1 reference picture may become an anchor picture. If the anchor block does no have motion information (e.g., in case of being coded in intra mode), a size of a motion vector becomes 0, and a reference picture index of the List0 reference picture becomes −1.

Moreover, a motion vector mvL0 of List0 and a motion vector mvL1 of List1 may be obtained from the motion vector mvCo1. Assuming that a speed of motion within a reference picture, a current picture, and an anchor picture is constant, a magnitude of each of the mvL0 and the mvL1 may become proportional to time intervals among the reference, current and anchor pictures. Hence, the mvL0 and the mvL1 may be obtained by using the interval between the reference picture and the current picture, and the interval between the reference picture and the anchor picture. In particular, in case that List0 reference index of the anchor block refers to a long-term reference picture, it is obtained by Formula 1.

$$mvL0=mvCo1$$

$$mvL1-0 \quad \text{[Formula 1]}$$

In case that List0 reference index of the anchor block does not refer to a long-term reference picture, it is obtained by Formula 2.

$$mvL0=mvCo1*(tb/td)$$

$$mvL1=mvCo1*(tb/td)$$

$$mvL1=-mvCo1*(td-tb)/td-mvL0-mvCo1 \quad \text{[Formula 1]}$$

Meanwhile, motion information of a current block may be predicted using motion information eon-elation in space direction. In this case, the anchor picture and the anchor block may be used in obtaining motion information.

First of all, a prediction mode of a current slice may be identified. For instance, if a slice type of a current slice is P slice or B slice, a skip mode may be used. And, motion information of neighboring blocks may be obtained. For instance, assuming that a block at a left side of a current block, a block at a top side of the current block, and a block at a right top side of the current block are named a neighboring block A, a neighboring block B and a neighboring block C, respectively, motion information of the neighbor blocks A, B and C may be obtained. A reference picture index of the current block for List0 or List1 direction may be derived using the motion information of the neighboring blocks. And, a first variable may be derived based on the reference picture index of the current block. In this case, the first variable may mean a variable used in predicting a motion vector of the current block as a random value. For instance, a reference picture index of the current block for the List0 or List1 direction may be derived into a smallest value among reference picture indexes of the neighboring blocks. For this, the following formula (Formula 3) is used.

$$refIdxL0=\text{MinPositive}(refIdxL0A,\text{MinPositive}(refIdxL0B,refIdxL0C))$$

$$refIdxL1=\text{MinPositive}(refIdxL1A,\text{MinPositive}(refIdxL1B,refIdxL1C)) \quad \text{[Formula 3]}$$

where, MinPositive(x, y)=Min(x, y) (x≥0 and y≥0)

$$\text{Max}(x,y)(\text{other cases})$$

For example, in detail, it becomes 'MinPositive(0,1)=0'. In particular, in case that two available indexes exist, a smaller value is obtained. Alternatively, it becomes 'MinPositive(−1,0)=0'. Namely, in case that one available index exists, a large value, which is a useful index value, is obtained. Alternatively, it becomes 'MinPositive(−1,−1)=−1'. Namely, in case that two are not available indexes at all, e.g., if both neighboring blocks are coded in an intra mode, or two neighboring blocks are not available, a large value '−1' is obtained. Therefore, in order to obtain an unavailable result value, any available value should not exist at all.

First of all, for an initial value of the first variable, the first variable may be set to 0. Moreover, in case that each reference picture index for the derived List0 and List1 directions is smaller than 0, a reference picture index of the current block for the List0 or List1 direction may be set to 0. And, the first variable may be set to a value for indicating that a reference picture of the current block does not exist. In this case, the case that each reference picture index for the derived List0 and List1 directions is smaller than 0 may mean a case that the neighboring block is coded in an intra mode, or a case that the neighboring block is not available, for example. In this case, a motion vector of the current block may be set to 0 by setting the first variable to 1.

Since three neighboring blocks are used for the present embodiment, in case that all three neighboring blocks are coded in an intra mode, or not available, a reference picture index of the current block may have an unavailable value '−1'. Hence, if all reference picture indexes of the current block are not available, the first variable is set to 1. In particular, if a reference picture of a current block fails to exist, the first variable is set to 1.

A second variable may be derived using the motion information of the anchor block within the anchor picture. In this case, the second variable may mean a variable that is used to predict a motion vector of a current block as a random value. For instance, in case that the motion information of the anchor block meets predetermined conditions, the second variable may be set to 1. If the second variable is set to 1, a motion vector of the current block for the List0 or List1 direction may be set to 0. The predetermined conditions include the following. First of all, a picture with a smallest reference picture index among reference pictures for the List1 direction should be a short-term reference picture. Secondly, a reference index of a referred picture of the anchor block should be set to 0. Thirdly, each of the horizontal and vertical components of a motion vector of the anchor block should be equal to or smaller than ±1. Thus, if all the predetermined conditions are met, it is determined that it is close to a video having almost no motion. And, the motion vector of the current block is then set to 0.

Motion information of a current block may be predicted based on the derived first and second variables. For instance, if the first variable is set to 1, the motion vector of the current block for the List0 or List1 may be set to 0. If the second variable is set to the motion vector of the current block for the List0 or List1 may be set to 0. In this case, the setting to 0 or 1 is just exemplary. And, the first or second variable is set to another predetermined value to use.

If the predetermined conditions are not met, motion information of a current block may be derived from motion information of neighboring blocks within a current picture. For instance, in case of a motion vector, the method for deriving motion vector of the skip macroblock may be identically applicable.

A reference picture index of the current block may be obtained in a manner of calculating a minimum value among reference picture indexes of the motion vectors located at left, top, and right top sides and then setting the minimum value to the reference picture of the current block. And, it is understood that the above mentioned contents relevant to the skip mode may be identically applicable to a case of coding a current block in a skip mode.

The intra predicting twit 160 performs intra prediction using a reconstructed pixel within a current picture. The reconstructed pixel within the current picture may include a pixel to which deblocking inkling is not applied. An original picture is then reconstructed by adding the predicted current picture and a residual outputted from the inverse transforming unit together. In the following description, an intra mode is explained in detail. First of all, 4×4 pixels, 8×8 pixels and 16×16 pixels may be used as block units for performing intra prediction. The 4×4 intra prediction obtains a predicted value of the 4×4 pixels within a prediction block using four right pixels within a left block, four bottom pixels within an upper block, one right bottom pixel within a left upper block and one left bottom pixel within a right upper block. In this case, regarding an intra prediction mode, a most suitable prediction direction is selected per 4×4 pixel block from 9 kinds of prediction directions in H.264/AVC and prediction is then performed by a block unit of 4×4 pixels based on the selected prediction direction. The 8×8 intra prediction can be preformed in the same manner of the 4×4 intra prediction. Meanwhile, the 16×16 intra prediction is performed by selecting one of the four kinds of methods including vertical prediction, horizontal prediction, average prediction and planar prediction from 16 bottom pixels of an upper macroblock of a current macroblock and 16 right pixels of a left macroblock of a current macroblock.

In the following description, a detailed method of determining the above described macroblock type is explained with reference to FIG. 2, FIG. 3 and FIG. 4.

Figure 2:
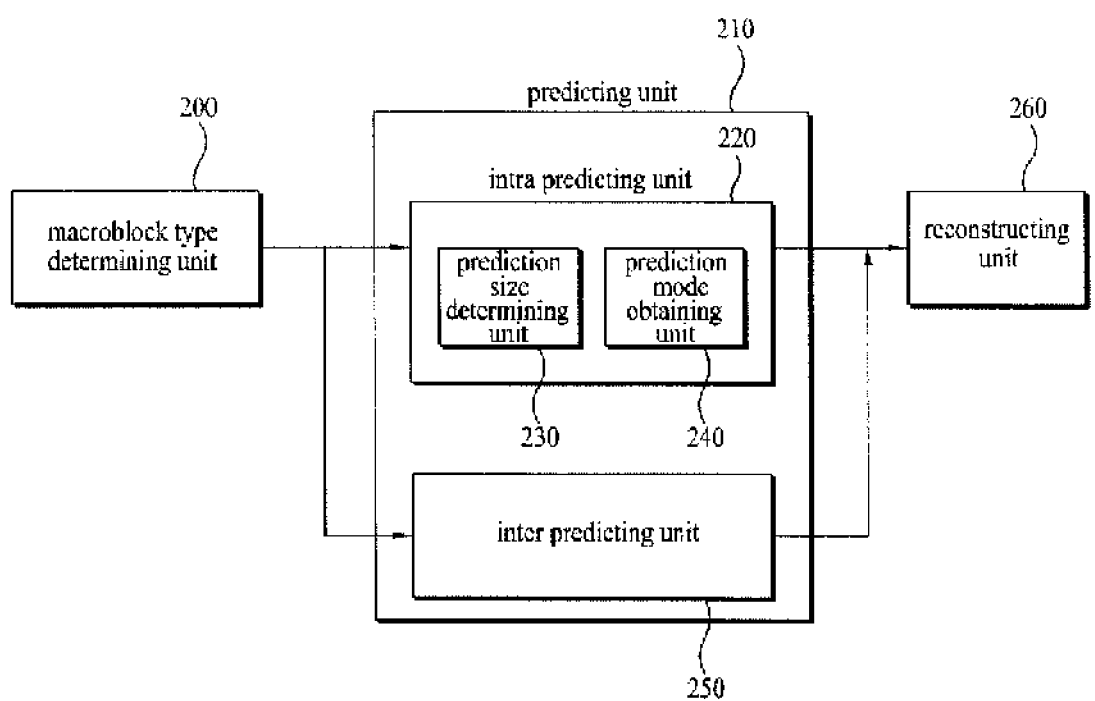
FIG. 2 is an apparatus for decoding a macroblock using a macroblock type and transform size information.

FIG. 2 is a block diagram of an apparatus for decoding a macroblock using a macroblock type and transform size information.

Referring to FIG. 2, a macroblock type determining unit 200 may obtain a macroblock type of a currently decoded macroblock from a bitstream transferred from an encoder. In the following description, a case of 32×32 macroblock is explained for example.

Figure 3:
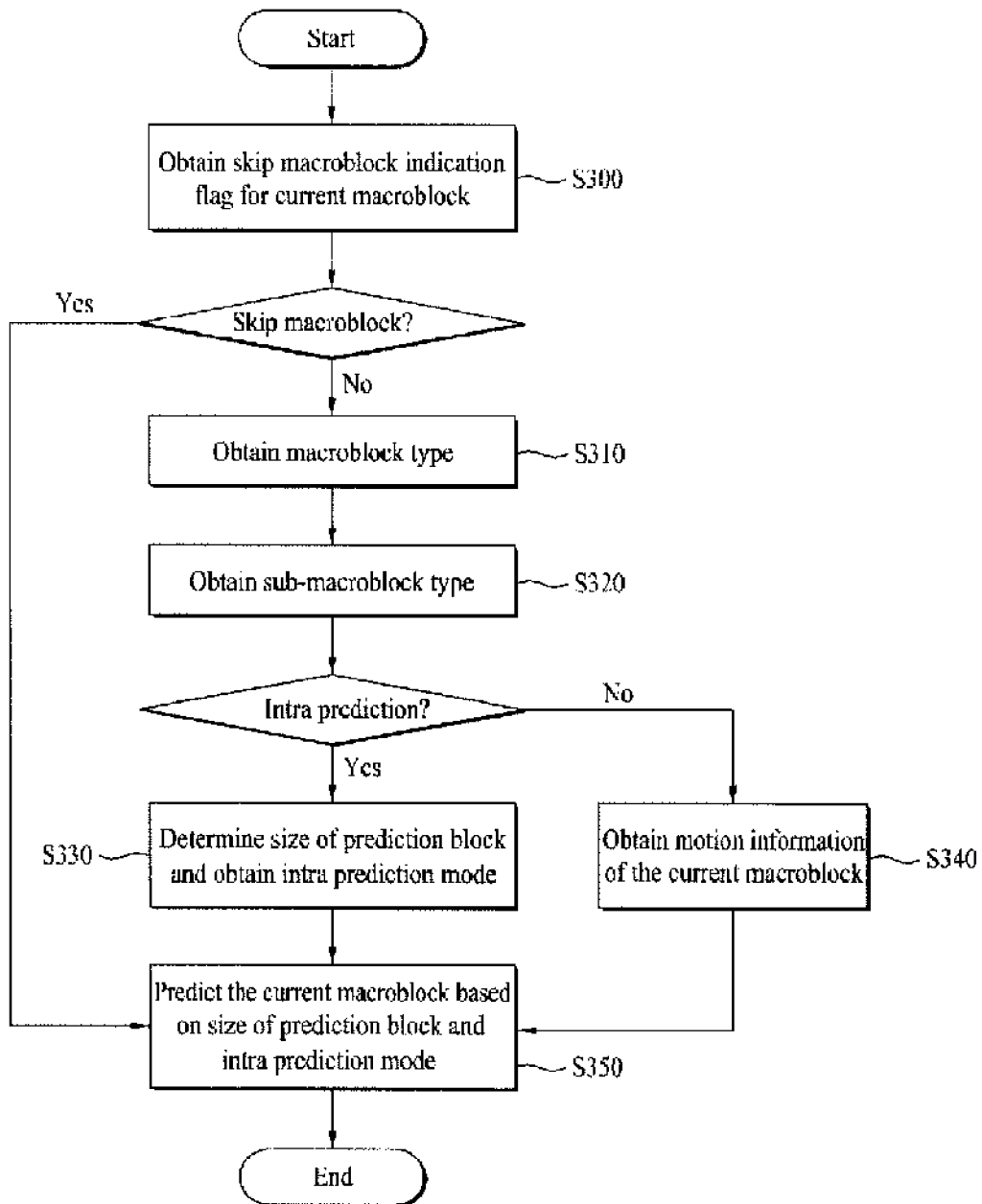
FIG. 3 is a flowchart of a process for decoding a macroblock using a macroblock type and transform size information.

FIG. 3 is a flowchart of a process for decoding a macroblock using a macroblock type and transform size information.

Referring to FIG. 3, skip macroblock indication information for a macroblock may be obtained [S300]. In this case, the skip mode indication information indicates whether a macroblock is coded in skip mode or not. For instance, if the skip mode indication information is set to 1, it may mean that the macroblock is coded in the skip mode. If the skip mode indication information is set to 0, it may mean that the macroblock is not coded in the skip mode. According to the skip mode indication information, if the macroblock is not coded in the skip mode, a macroblock type may be obtained from the bitstream [S310]. In case of I slice, the macroblock may be predicted by a block unit of 32×32 pixels, 16×16 pixels or 8×8 pixels according to the macroblock type.

Like the P macroblock and the B macroblock, a sub-macroblock type may be defined. The sub-macroblock type may be obtained based on the macroblock type [S320].

For instance, a sub-macroblock type may be obtained when the macroblock type is 16×16. This sub-macroblock type may include prediction mode information and a size of a prediction block. Therefore, according to the sub-macroblock type, the sub-macroblock may be predicted by a block unit of 16×16 pixels, 8×8 pixels or 4×4 pixels. The sub-macroblock type may include prediction mode information only. Namely, the sub-macroblock type indicates whether the sub-macroblock is predicted in an intra mode or not. In the following description, if a sub-macroblock type includes prediction mode information only, a method of obtaining a size of a prediction block in a sub-macroblock and an intra prediction mode is explained.

First of all, the intra predicting mode 210 includes a prediction block size determining unit 230 and an intra prediction mode obtaining unit 240. If it is indicated that the sub-macroblock is predicted in the intra mode according to the sub-macroblock type, the prediction block size determining unit 230 determines the size of the prediction block using transform size information. And, the intra prediction mode obtaining unit 240 obtains an intra prediction mode of the sub-macroblock from a bitstream transferred from an encoder [S330].

For instance, if the sub-macroblock is predicted in the intra mode according to the sub-macroblock type, transform size information for the sub-macroblock may be obtained. In this case, the transform size information may include the information indicating a block unit for performing transform coefficient decoding and picture generation. In case that the transform size information indicates to perform the transform coefficient decoding and picture generating process by a block unit of 4×4 pixels, the size of a prediction block of the sub-macroblock may be determined into 4×4 pixels and the sub-macroblock may be predicted by a block unit of 4×4 pixels. In case that the transform size information includes 8×8 pixels or 16×16 pixels, the same scheme may be applicable thereto.

In case that the sub-macroblock is predicted in the intra mode according to the sub-macroblock type, an intra prediction mode of the sub-macroblock may be obtained based on intra prediction mode reference information. In this case, the intra prediction mode reference information indicates whether the intra prediction mode of the prediction block is derived from an intra prediction mode of a neighboring block.

For instance, the intra prediction mode reference information may be obtained when the sub-macroblock is predicted in the intra mode according to the sub-macroblock type. If the intra prediction mode reference information indicates that the intra prediction mode of the predicted block is derived from the intra prediction mode of the neighboring block, the intra prediction mode for the prediction block within the sub-macroblock may be derived using the intra prediction modes of left and right blocks of the prediction block. The intra prediction mode may be derived into a minimum value of the intra prediction modes of the left and right blocks. If the intra prediction mode reference information indicates that the intra prediction mode of the prediction block is not derived from the intra prediction mode of the neighboring block, the intra prediction mode for the prediction block within the sub-macroblock may be parsed from the bitstream. The above mentioned method of obtaining the size of the prediction block and the intra prediction mode may be identically applicable to block coded in an intra mode in the following.

Subsequently, the sub-macroblock may be predicted using the size of the prediction block, the intra prediction mode, and the pixel value within the neighboring block of the sub-macroblock [S350]. The reconstructing unit 260 reconstructs a macroblock by adding the predicted macroblock and the residual transferred from the encoder together. In this case, the residual value may be defined as a difference value between a pixel value of an original macroblock and a pixel value of a predicted macroblock.

If the sub-macroblock is coded in an inter mode according to the sub-macroblock type, the inter prediction unit 240 obtains motion information of the sub-macroblock [S340].

For instance, the sub-macroblock type may be defined as FIG. 4. FIG. 4 is a table of sub-macroblock type of P macroblock and B macroblock when a size of a macroblock is 32×32. Referring to FIG. 4, if the sub-macroblock type is set to P_L0_16×8, the sub-macroblock may include two partitions of the sub-macroblock and may be predicted by a block unit of 16×8 pixels. In particular, a motion vector and a reference picture index may be obtained per partition of the sub-macroblock. The sub-macroblock may be predicted using the motion vector and the reference picture index [S350]. The reconstructing unit 250 then reconstructs a macroblock by adding the predicted macroblock and the residual transferred from the encoder together.

In case that the macroblock is coded in a skip mode according to the skip mode indication information, the macroblock may be predicted by deriving motion information from a reference picture and a reference block [S350].

In the following description, a macroblock type for a macroblock greater than 16×16 is explained with reference to FIG. 5.

FIG. 5 is a diagram of an intra macroblock type according to one embodiment if a size of a macroblock is 32×32.

Referring to FIG. 5 (a), if a macroblock is 32×32, the macroblock may be predicted by a block unit of 32×32 pixels, 16×16 pixels or 8×8 pixels. If a macroblock type is intra 32×32, the macroblock may be predicted from 32 bottom pixels of a top macroblock of the macroblock and 32 right pixels of a left macroblock of the macroblock by obtaining one of four kinds of modes including vertical prediction, horizontal prediction, average prediction, and planar prediction. If a macroblock type is intra 16×16, the macroblock may be predicted by obtaining a prediction value of 16×16 pixels from 16 right pixels within a left block, 16 bottom pixels within a top block, 1 right bottom pixel within a left top block and 1 left bottom pixel within a right top block. In this case, regarding the intra prediction mode, most proper intra prediction mode may be obtained from 9 kinds of modes per 16×16 pixel block. It may be predicted by a block unit of 16×16 pixels based on the obtained intra prediction mode. In case that the macroblock type is intra 8×8, it may be predicted by the same method as the intra 16×16.

Referring to FIG. 5 (b), if a macroblock is 32×32, the macroblock may be predicted ley a block unit of 4×4 pixels as well as 32×2 pixels, 16×16 pixels or 8×8 pixels. In this case, it may be predicted by the same method as the intra 16×16.

Referring to FIG. 5 (c), if a macroblock is 32×32, the macroblock type may include the intra-mixed as well as intra 32×32, infra 16×16 or intra 8×8. In case that the macroblock type is the intra-mixed, a block type on a partition of the macroblock may be obtained. Accordingly, intra prediction may be adaptively performed by a block unit of intra 8×8 or intra 4×4. In this case, the partition of the macroblock may mean a block within a macroblock partitioned in to equal sizes, and indicate a sub-macroblock.

Another embodiment of the intra-mixed is explained with reference to FIG. 5 (d) as follows. In case that a macroblock is 32×32, intra 32×32 or intra mixed may be defined as a macroblock type of I slice. If the macroblock type is the intra-mixed, intra prediction may be performed on a partition of the macroblock by a block unit of intra 16×16, intra 8×8 or intra 4×4. Therefore, unlike FIG. 5 (c), the intra 16×16 or the intra 8×8 may not be used as the macroblock type.

In the following description, in case that a macroblock type of I slice may be defined as intra N×N (where, N is an integer greater than 16) or intra-mixed, a method of decoding a macroblock is explained with reference to FIGS. 6 to 8.

Figure 6:
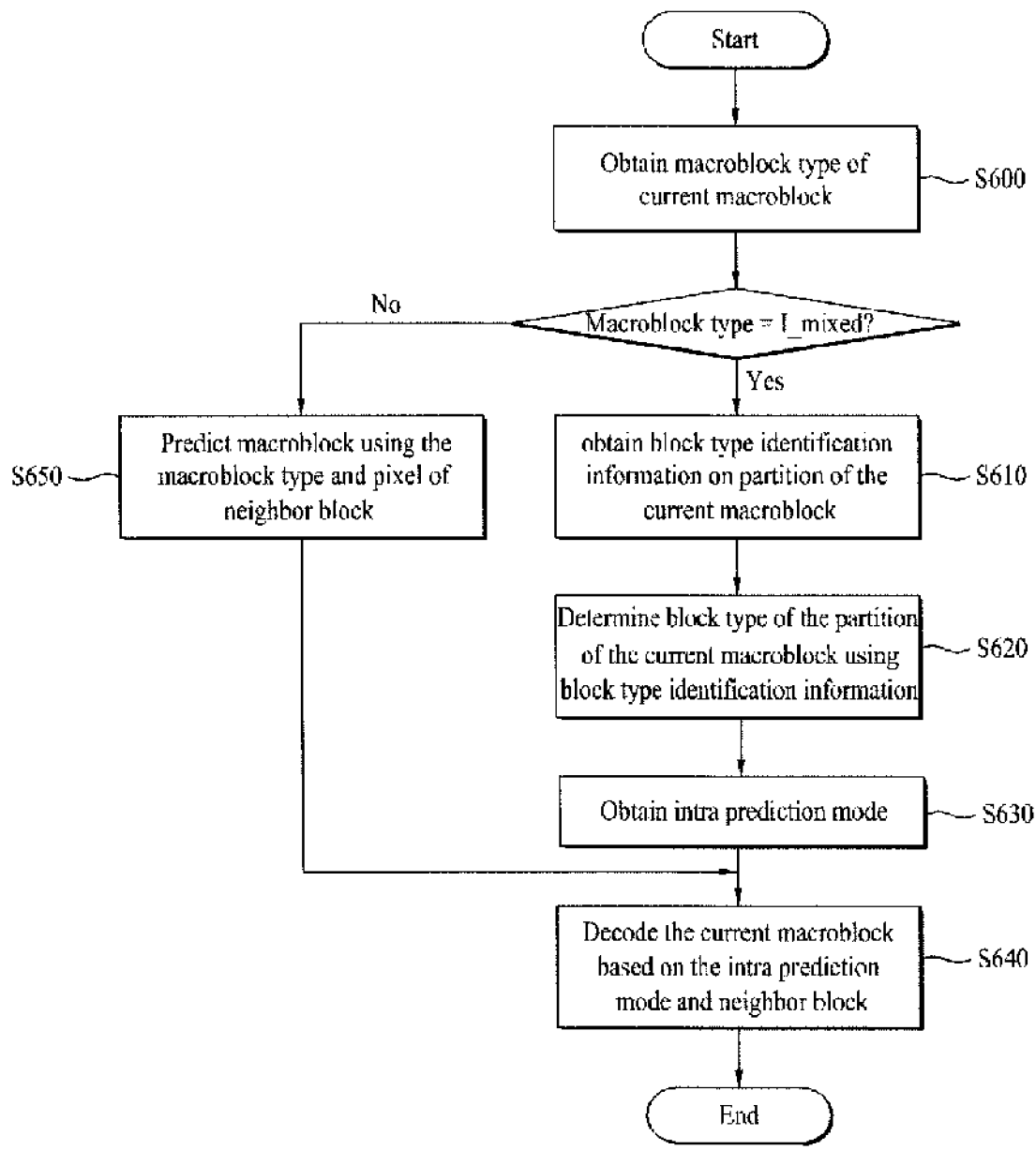
FIG. 6 is a flowchart for a method of decoding a sub-macroblock using macroblock type information and block type indication information.

FIG. 6 is a flowchart for a method of decoding a sub-macroblock using a macroblock type and block type indication information.

Referring to FIG. 6, a macroblock type for a current macroblock may be obtained in a macroblock layer [S600]. Block type identification information on a partition of the current macroblock may be obtained when the macroblock type is intra-mixed [S610]. In this case, the partition of the macroblock may mean a block partitioned into equal sizes within the macroblock. For instance, if a macroblock is 32×32, a partition of the macroblock may be set to four 16×16 blocks. A block type of the partition of the current macroblock may be determined by using the block type identification information [S620]. This is explained with reference to FIG. 7 as follows.

Figure 7:
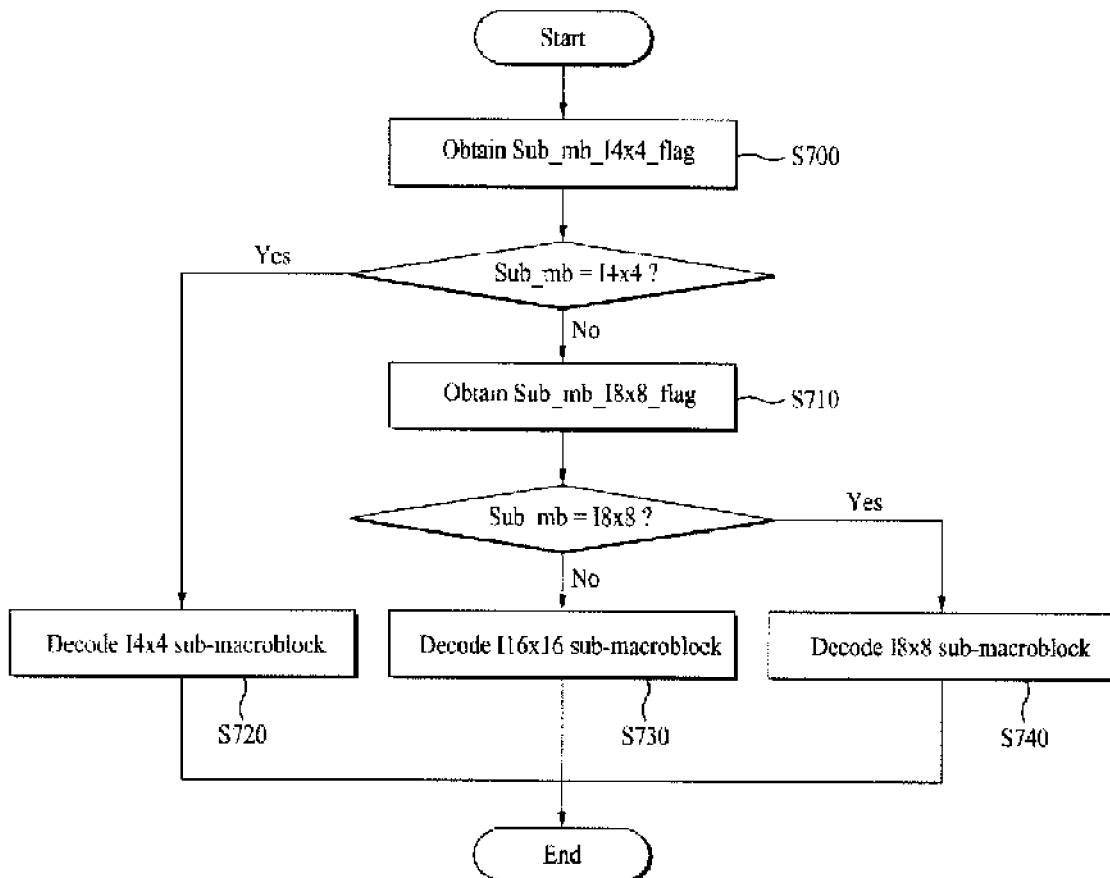
FIG. 7 is a flowchart for a method of determining a sub-macroblock type using block type indication information according to one embodiment.

FIG. 7 is a flowchart for a method of determining a sub-macroblock type using block type indication information according to one embodiment.

Referring to FIG. 7, it may obtain first block type identification information on a partition of a macroblock [S700]. In this case, first block type identification information may indicate whether a block type of the partition of the macroblock is intra 4×4. According to the first block type identification information, if the block type of the partition of the macroblock is intra 4×4, the partition of the macroblock may be predicted by a block unit of 4×4 pixels [S720]. According to the first block type identification information, if the block type of the partition of the macroblock is not the intra 4×4, it may obtain second block type identification information [S710]. In this case, the second block type identification information may indicate whether a block type of the partition of the macroblock is intra 8×8. According to the second block type identification information, if the block type of the partition of the macroblock is intra 8×8, the partition of the macroblock may be predicted by a block unit of 8×8 pixels [S740]. According to the second block type identification information, if the block type of the partition of the macroblock is not the intra 8×8, the partition of the macroblock may be predicted by a block unit of 16×16 pixels [S730].

Referring now to FIG. 6, it may obtain an intra prediction mode for the partition of the current macroblock [S630]. As mentioned in the foregoing description, the intra prediction mode for the partition of the current macroblock may be derived from an intra prediction mode of a neighboring block based on intra prediction mode reference information, or may be parsed from a bitstream. For instance, if the partition of the current macroblock is 16×16 and the block type of the partition of the current macroblock is intra 4×4, the ultra prediction mode may be obtained by 4×4 block unit within the partition of the current macroblock.

Yet, in case that the macroblock type of the current macroblock is not the intra-mixed, it may predict the current macroblock based on the macroblock type [S650]. In this case, the macroblock type may include an intra prediction mode and CBP information. Therefore, it may predict a pixel value of the current macroblock using the intra prediction mode according to the macroblock type and a pixel of a neighboring block. And, the neighboring block may mean the block reconstructed prior to the current macroblock. For instance, the neighboring block may mean a left block of the current macroblock, or a top block of the current macroblock. And, the pixel of the neighboring block may include the reconstructed pixel to which deblocking filtering is not applied.

Yet, if the macroblock type does not include the intra prediction mode and the CBP (Coded Block Pattern) information, it may separately obtain the intra prediction mode and CBP (Coded Block Pattern) information. This is explained with reference to FIG. 8 as follows.

Figure 8:
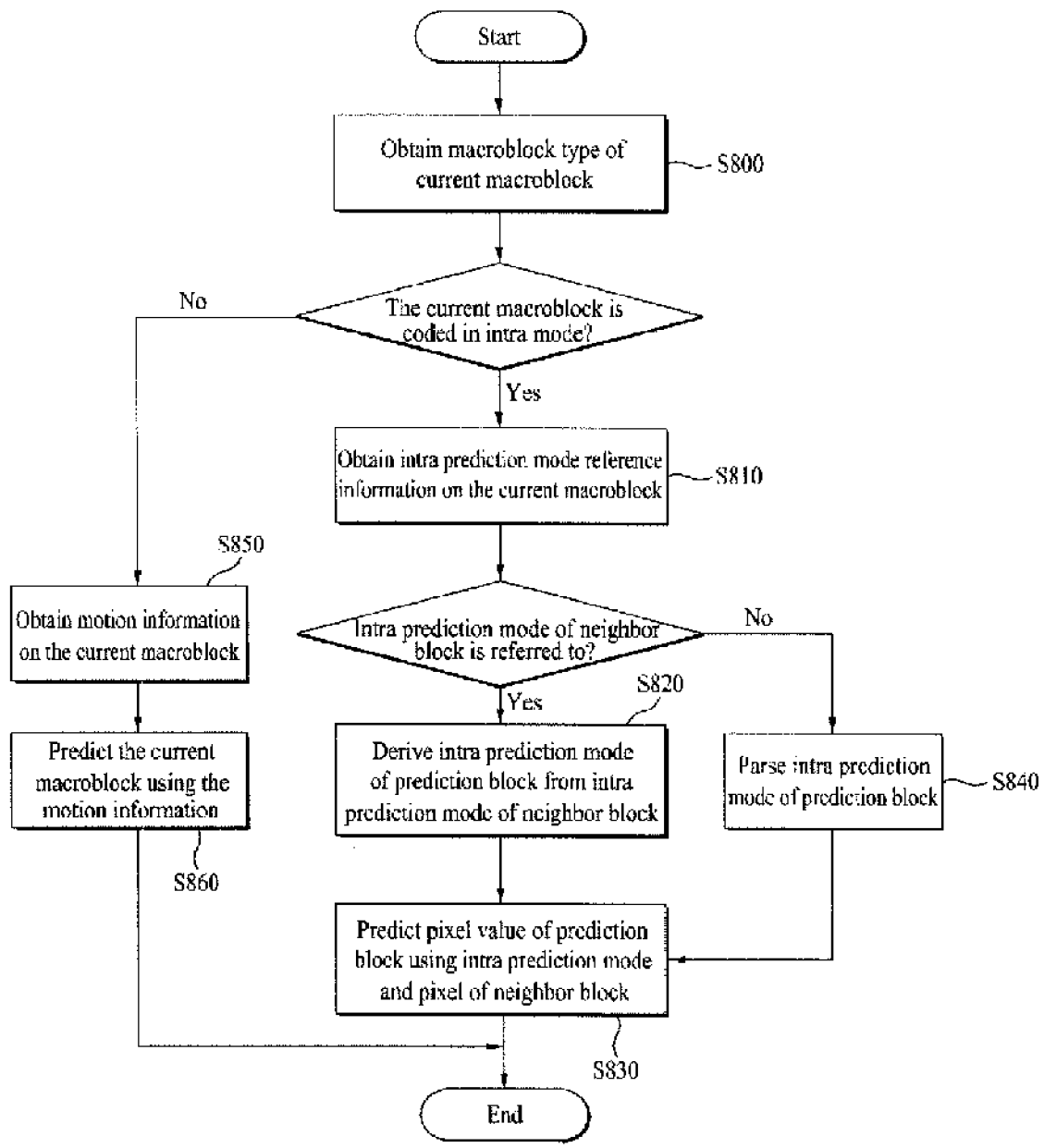
FIG. 8 is a flowchart for a method of obtaining an intra prediction mode of a macroblock when the macroblock is coded in intra mode.

FIG. 8 is a flowchart for a method of obtaining an intra prediction mode of a macroblock when the macroblock is coded in intra mode.

Referring to FIG. 8, it may obtain a macroblock type of a current macroblock [S800]. In case that the current macroblock is coded in intra mode according to the macroblock type, it may obtain intra prediction mode reference information on the current macroblock [S810]. For instance, if the current macroblock is predicted in intra mode, the macroblock type may be intra N×N or intra-mixed. The intra prediction mode reference information may be obtained by a prediction block unit of the current macroblock. In case that the infra prediction mode reference information indicates that an intra prediction mode of a predicted block is derived from an intra prediction mode of a neighboring block, it may derive the intra prediction mode of the prediction block using intra prediction modes of left and right blocks of the prediction block [S820]. The derived intra prediction mode may be derived into a minimum value in the intra prediction modes of the left and right blocks. In case that the intra prediction mode reference information indicates that an intra prediction mode of a predicted block is not derived from an intra prediction mode of a neighboring block, it may parse the intra prediction mode of the prediction block from a bitstream [S840]. It may predict a pixel of the prediction block using the intra prediction mode and the pixel of the neighboring block [S830]. For instance, the prediction block may mean a block reconstructed prior to the predicted block. For instance, the neighboring blocks may include a left block of the prediction block and a top block of the prediction block. The pixel of the neighboring block may include a reconstructed pixel to which deblocking filtering is not applied.

In case that the current macroblock is predicted in inter mode according to the macroblock type, motion information of the current macroblock may be obtained [S850]. It may predict the current macroblock in inter mode by using the motion information [S860].

In the following description, in case that a macroblock is a boundary macroblock, a method of determining a macroblock type of the macroblock is explained.

Figure 9:
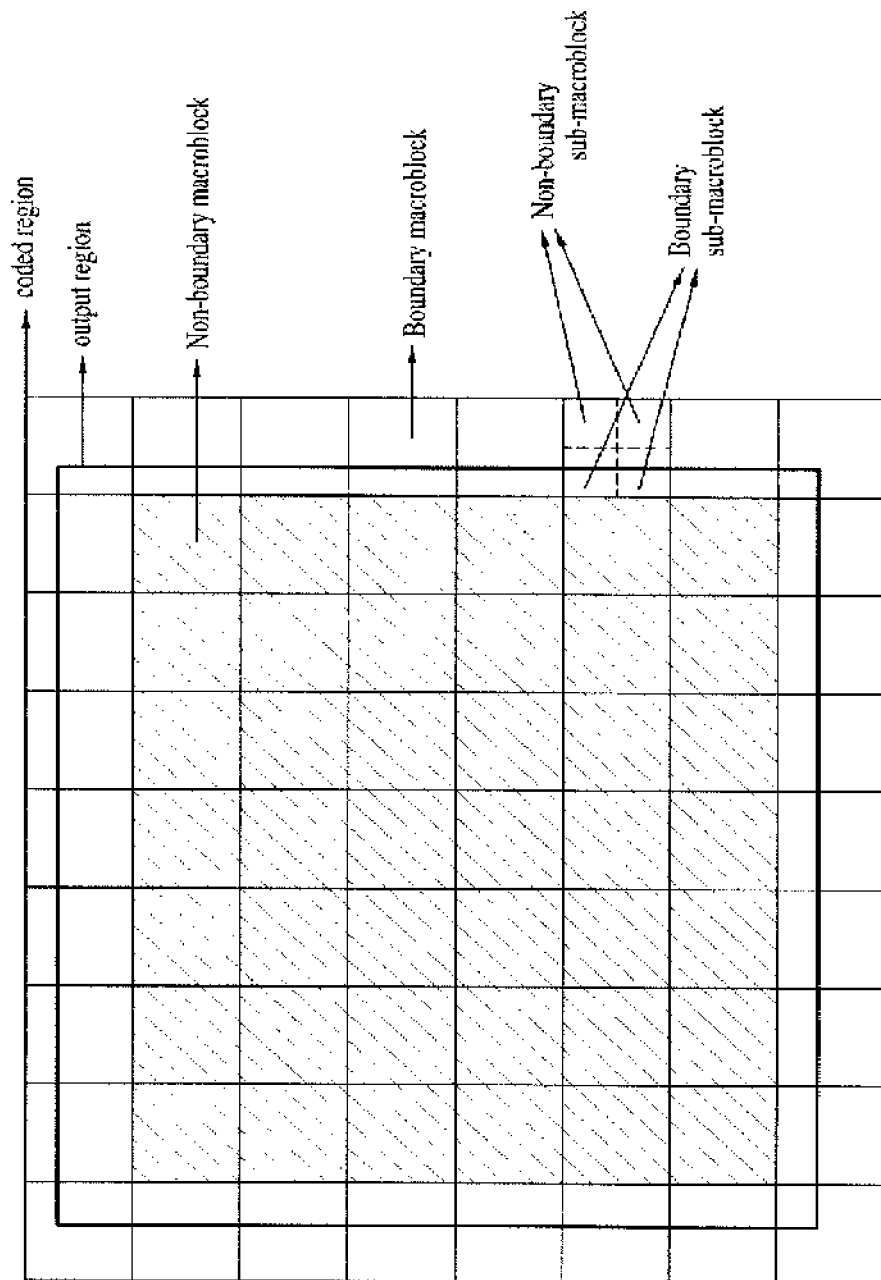
FIG. 9 is a diagram of a boundary macroblock and a boundary sub-macroblock.

FIG. 9 is a diagram of a boundary macroblock and a boundary sub-macroblock.

Referring to FIG. 9, a coded region may be a frame outputted by a decoding process. An output region may be a rectangular region specified within the coded region, or may include a region actually displayed in the coded region in a narrow meaning. A boundary macroblock may be a macroblock including a region not belonging to the output region. And, a non-boundary macroblock may be a macroblock including a region belonging to the output region only. A boundary sub-macroblock is a sub-macroblock within the boundary macroblock and may be a sub-macroblock including a region belonging to the output region. On the contrary, a non-boundary sub-macroblock may be a sub-macroblock remaining in the boundary macroblock except the boundary sub-macroblock. Namely, the non-boundary sub-macroblock may be a sub-macroblock failing to include a region belonging to the output region as a sub-macroblock within the boundary macroblock.

Figure 10:
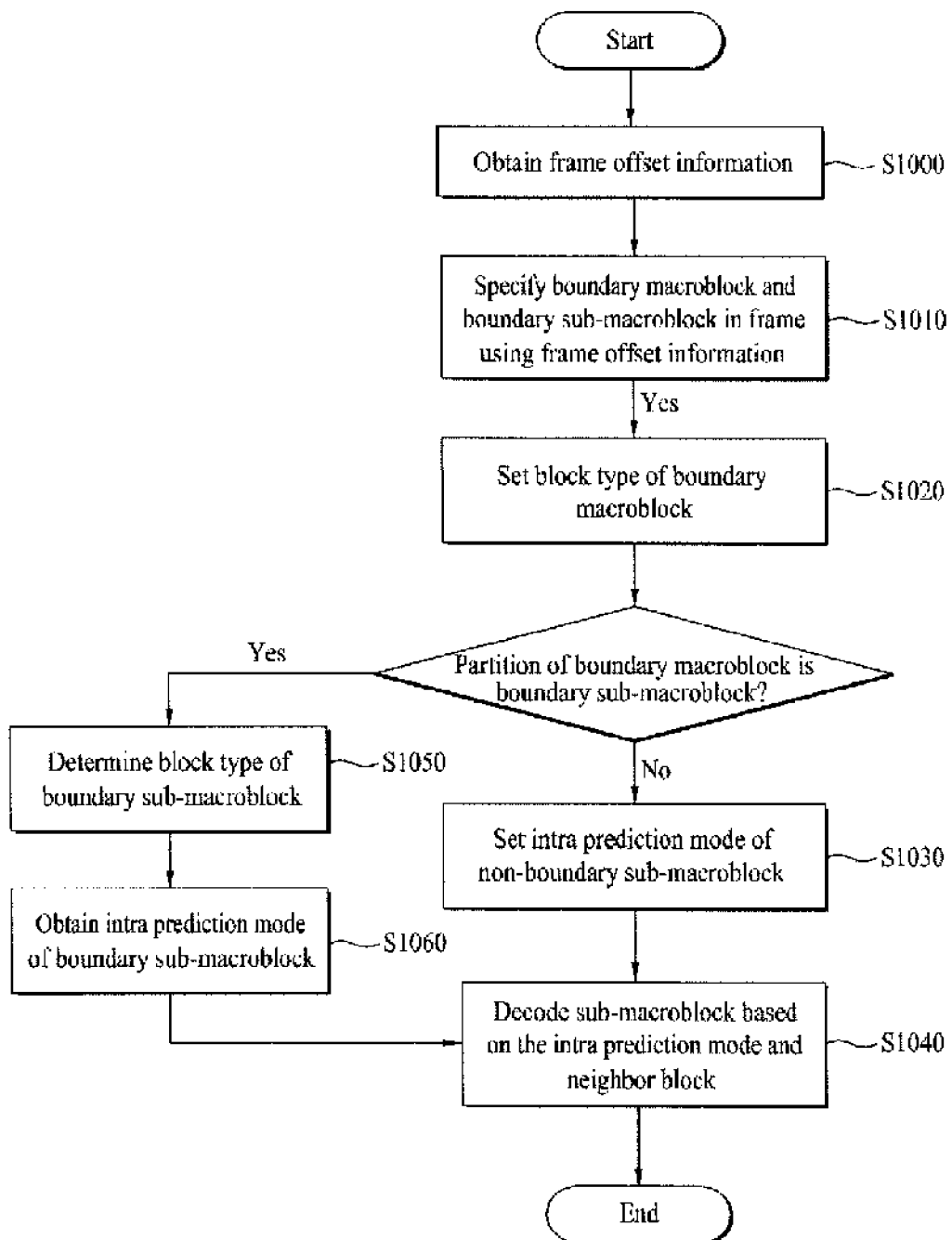
FIG. 10 is a flowchart for a method of decoding a sub-macroblock within a boundary macroblock in I slice.

FIG. 10 is a flowchart for a method of decoding a sub-macroblock within a boundary macroblock in case of I slice.

Referring to FIG. 10, it may obtain frame offset information for a video sequence [S1000]. In this case, the frame offset information may specify samples belonging to a specific region within a frame as samples within a picture of the video sequence. Alternatively, the frame offset information may specify samples belonging to the output region. Using the frame offset information, it may specify a boundary macroblock within a frame [S1010]. If a current macroblock is a boundary macroblock according to the frame offset information, a macroblock type of the current macroblock may be set to intra-mixed [S1020]. In this case, it may specify whether a partition of the current macroblock is a boundary sub-macroblock or not based on the frame offset information. If the partition of the current macroblock is the boundary sub-macroblock, as mentioned in the foregoing description with reference to FIG. 7, it may determine a boundary sub-macroblock type [S1050]. And, it may obtain an intra prediction mode of the boundary sub-macroblock according to the boundary sub-macroblock type [S1060]. Using the intra prediction mode and a pixel value within a neighboring block of the boundary sub-macroblock, it may predict a pixel value of the boundary sub-macroblock [S1040]. Yet, if the current sub-macroblock is a non-boundary sub-macroblock, the current sub-macroblock may be predicted by a block unit of a predetermined size. For instance, in case that the current macroblock is 32×32, a block type of the current sub-macroblock may be set to intra 16×16. Moreover, CBP (coded block pattern) information may be set to 0. The CBP (coded block pattern) information may indicates whether the current sub-macroblock has a luminance coefficient or not.

Meanwhile, in case that the current sub-macroblock is a non-boundary sub-macroblock, an intra prediction mode of the current sub-macroblock may be not separately obtained. Instead, one of 9 kinds of intra prediction modes may be set to the intra prediction mode of the current sub-macroblock based on position information of the current sub-macroblock [S1030]. The current sub-macroblock may be located at a left side, a right side, a top, a bottom, a left top, a left bottom, a right top or a right bottom within the current frame. And, it may determine the intra prediction mode in consideration of a neighboring block of the current sub-macroblock and the position of the current sub-macroblock. In this case, the neighboring block may be a block adjacent to the current sub-macroblock, and may mean a block having a pixel value reconstructed prior to the current sub-macroblock. Detailed embodiment shall be described with reference to FIG. 11. Using the intra prediction mode and the pixel value within the neighboring block of the non-boundary sub-macroblock, it may predict a pixel value of the non-boundary sub-macroblock [S1040].

FIG. 11 is a diagram for a method of setting an intra prediction mode of a non-boundary sub-macroblock.

Referring to FIG. 11 (a), in case that a non-boundary sub-macroblock is located at a right side within a frame, a left sub-macroblock of the non-boundary sub-macroblock has a reconstructed pixel value. And, it may be efficient to predict the non-boundary sub-macroblock using the horizontal prediction among the 9 kinds of intra prediction modes.

Referring to FIG. 11 (b), in case that a non-boundary sub-macroblock is located at a bottom within a frame, it may be efficient to predict the non-boundary sub-macroblock using the vertical prediction among the 9 kinds of intra prediction modes.

Referring to FIG. 11 (c), in ease that a non-boundary sub-macroblock is located at a right bottom within a frame, it is able to predict the non-boundary sub-macroblock using vertical prediction and horizontal prediction. In particular, as a boundary sub-macroblock having an index set to 0 is located to the left of a non-boundary sub-macroblock having an index set to 1, it may set an intra prediction mode to the horizontal prediction. As a boundary sub-macroblock having an index set to 0 is located above a non-boundary sub-macroblock having an index set to 2, it may set an intra prediction mode to the vertical prediction. As a non-boundary sub-macroblock having an index set to 1 is located above to non-boundary sub-macroblock having an index set to 3, it may set an intra prediction mode to the vertical prediction. Otherwise, an ultra prediction mode of a non-boundary sub-macroblock may be set to average prediction.

Using the set intra prediction mode and the reconstructed pixel value of the neighboring block of the non-boundary sub-macroblock, a pixel value of the non-boundary sub-macroblock may be predicted [S1030].

Figure 12:
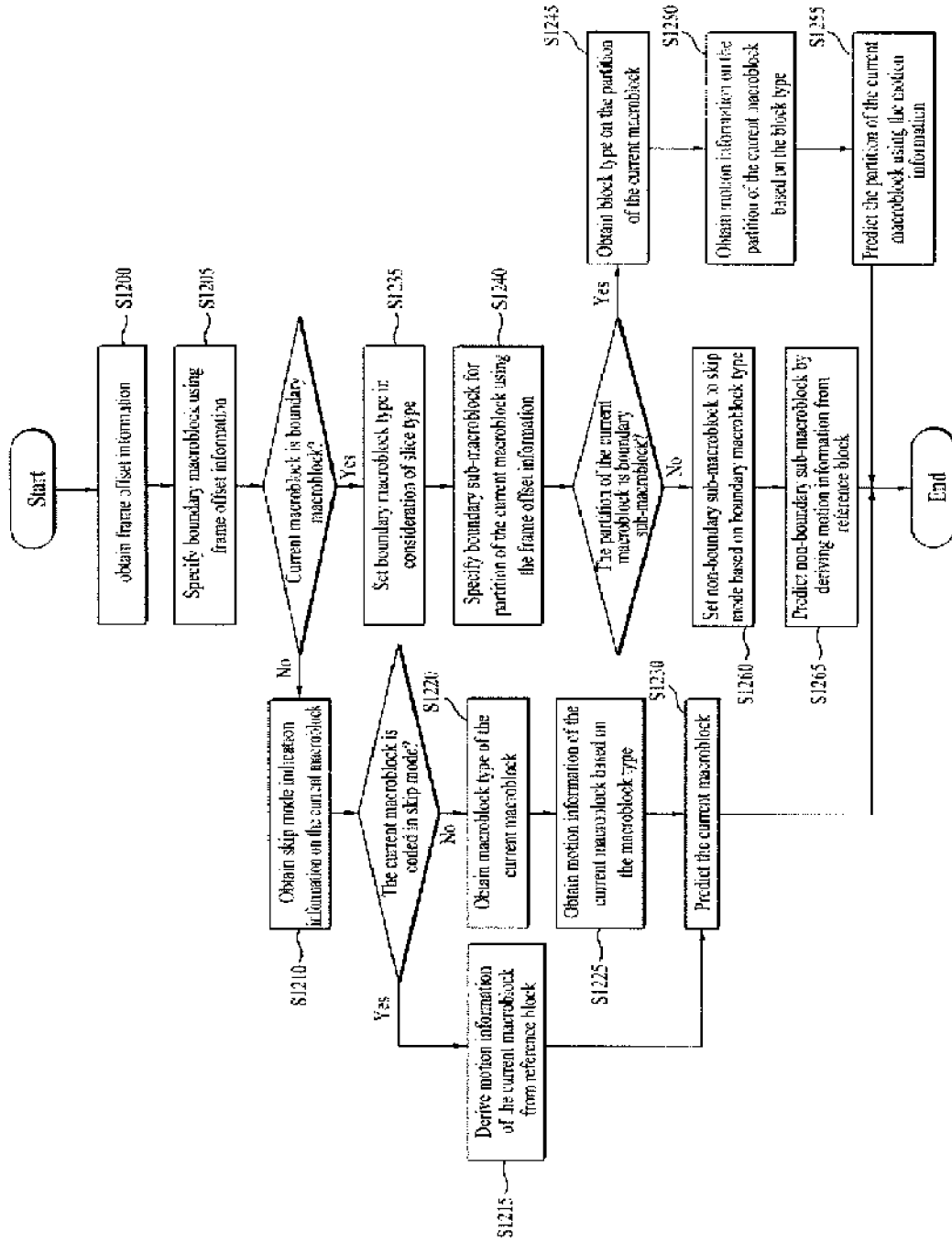
FIG. 12 is a flowchart for a method of decoding a sub-macroblock within a boundary macroblock in P slice or B slice.

FIG. 12 is a flowchart for a method of decoding a sub-macroblock within a boundary macroblock in ease of P slice or B slice.

Referring to FIG. 12, it may obtain frame offset information for a video sequence [S1200]. As mentioned in the foregoing description, it may specify whether a macroblock within a frame is a boundary macroblock or not by using the frame offset information [S1205].

In case that a current macroblock is a non-boundary macroblock according to the frame offset information, it may obtain skip mode indication information from a slice header [S1210]. In case that the current macroblock is coded in a skip mode according to the skip mode indication information, motion information, reference picture index and the like may be not obtained. Yet, it may derive motion information and a reference picture index from a reference block [S1215]. Using the derived motion information and the derived reference picture index, it may predict the current macroblock [S1230]. In case that the current macroblock is not coded in the skip mode according to the skip mode indication information, it may obtain a macroblock type from a macroblock layer [S1220]. It may obtain the motion information on a partition of the current macroblock according to the macroblock type [S1225]. Based on the motion information, it may predict the current macroblock [S1230].

In case that the current macroblock is a boundary macroblock according to the frame offset information, a macroblock type of the current macroblock may be not transferred and may be set in consideration of a slice type [S1235]. The macroblock type of the current macroblock may include partition information of the current macroblock. And, the partition information of the current macroblock may mean a block unit for performing inter prediction.

For example, when the current macroblock is 32×32, if a slice type is P it may be set to P_16×16, P_32×16 or P_16×32. If a slice type is B slice, it may be set to B_16×16, B_32×16 or B_16×32. In addition, it may determine a macroblock type of the current macroblock in consideration of a position of a boundary macroblock. This is explained with reference to FIG. 13 as follows.

FIG. 13 is a diagram fora method of determining a macroblock type according to a position of a boundary macroblock within P slice or B slice.

Referring to FIG. 13 (a), in case that a boundary macroblock is located at the left or right side within a frame, a macroblock type of the boundary macroblock may be set to P_16×32 or B_16×32 in consideration of a slice type.

Referring to FIG. 13 (b), in case that a boundary macroblock is located at top or bottom within a frame, a macroblock type of the boundary macroblock may be set to P_36×16 or B_32×16 in consideration of a slice type.

In case that the current macroblock is the boundary macroblock, it may specify whether a partition of the current macroblock is a boundary sub-macroblock or not by using the frame offset information [S1240]. In this case, the partition of the current macroblock may be interpreted as having the same meaning of the current sub-macroblock. In case that the partition of the current macroblock is the boundary sub-macroblock, a block type for the partition of the current macroblock is obtained from a sub-macroblock layer [S1245]. Based on the block type, it may obtain motion information for the partition of the current macroblock [S1250]. Using the obtained motion information, it may predict the partition of the current macroblock [S1255].

In case that the partition of the current macroblock is a non-boundary sub-macroblock, the partition of the current macroblock may be set to be coded using a skip mode [S1260]. Therefore, the partition of the current macroblock may derive the motion information from a reference block. Based on the derived motion information, it may perform inter prediction [S1265].

Accordingly, the present invention is applicable to video signal encoding/decoding.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for processing a video signal by a decoding apparatus, the method comprising:
   determining, by the decoding apparatus, a slice type of a slice including a current block;
   determining, by the decoding apparatus, based on the determined slice type being P slice or B slice, whether the current block is coded based on a skip mode, wherein motion vector information, reference picture index information, and residual data for the current block are not obtained from the video signal based on the current block being coded in the skip mode;
   obtaining, by the decoding apparatus, candidate index information for the current block based on the current block being coded in the skip mode;
   determining, by the decoding apparatus, motion information of the current block to be motion information of a neighboring block indicated by the candidate index information from among neighboring blocks of the current block; and
   reconstructing, by the decoding apparatus, the current block based on the determined motion information.

2. A method for generating a video signal by an encoding apparatus, the method comprising:
   determining, by the encoding apparatus, a slice type of a slice including a current block;
   determining, by the encoding apparatus, based on the determined slice type being P slice or B slice, whether the current block is coded based on a skip mode, wherein motion vector information, reference picture index information, and residual data for the current block are not encoded into the video signal based on the current block being coded in the skip mode;
   selecting, by the encoding apparatus, motion information of a neighboring block from among neighboring blocks of the current block based on the current block being coded in the skip mode;
   determining, by the encoding apparatus, candidate index information for the current block, the candidate index information indicating the selected motion information from among neighboring blocks of the current block; and
   encoding, by the encoding apparatus, the candidate index information for the current block.

3. A method for transmitting a video signal generated by an encoding method, the encoding method comprising:
   determining, by the encoding apparatus, a slice type of a slice including a current block;
   determining, by the encoding apparatus, based on the determined slice type being P slice or B slice, whether the current block is coded based on a skip mode, wherein motion vector information, reference picture index information, and residual data for the current block are not encoded into the video signal based on the current block being coded in the skip mode;
   selecting, by the encoding apparatus, motion information of a neighboring block from among neighboring blocks of the current block based on the current block being coded in the skip mode;
   determining, by the encoding apparatus, candidate index information for the current block, the candidate index information indicating the selected motion information from among neighboring blocks of the current block; and
   encoding, by the encoding apparatus, the candidate index information for the current block.

* * * * *